United States Patent
Chouery

(10) Patent No.: US 7,299,762 B2
(45) Date of Patent: Nov. 27, 2007

(54) STABILIZING SURFACE FOR FLIGHT DECK OR OTHER USES

(75) Inventor: Farid A. Chouery, Seattle, WA (US)

(73) Assignee: FAC Systems, Inc., Seattle, WA (US)

( * ) Notice: Subject to any disclaimer, the term of this patent is extended or adjusted under 35 U.S.C. 154(b) by 0 days.

(21) Appl. No.: 11/357,370

(22) Filed: Feb. 17, 2006

(65) Prior Publication Data
US 2006/0191459 A1 Aug. 31, 2006

Related U.S. Application Data

(63) Continuation-in-part of application No. 11/039,548, filed on Jan. 19, 2005, now Pat. No. 7,040,247.

(60) Provisional application No. 60/539,922, filed on Jan. 28, 2004.

(51) Int. Cl.
*B63B 35/50* (2006.01)
(52) U.S. Cl. .................................... 114/261
(58) Field of Classification Search ............... 114/261
See application file for complete search history.

(56) References Cited

U.S. PATENT DOCUMENTS

| 1,558,567 | A | 10/1925 | Schein |
| 3,948,467 | A | 4/1976 | Krusius |
| 4,662,265 | A | 5/1987 | Becker et al. |
| 4,799,828 | A | 1/1989 | Georgii |
| 5,267,503 | A | 12/1993 | Grabner |
| 5,367,973 | A | 11/1994 | Heggertveit |
| 5,398,635 | A | 3/1995 | Tellington |
| 5,588,387 | A | 12/1996 | Tellington |
| 7,040,247 | B2 * | 5/2006 | Chouery ............... 114/261 |

* cited by examiner

Primary Examiner—Jesús D. Sotelo
(74) Attorney, Agent, or Firm—Klarquist Sparkman, LLP

(57) ABSTRACT

A mechanism for maintaining a surface such as a landing pad in a desired orientation with respect to a supporting surface includes a pair of columns that rotate with respect to each other. The angle at which the columns engage, or the angle at which the columns engage the surface and the supporting surface, are offset with respect to a line perpendicular to the longitudinal axis of the cylinders. By selectively rotating the columns with respect to each other and with respect to the supporting surface, the tilt and orientation of the surface are adjusted.

24 Claims, 13 Drawing Sheets

STABILIZING SURFACE FOR FLIGHT DECK OR OTHER USES

CROSS-REFERENCES TO RELATED APPLICATIONS

The present application is a continuation-in-part of U.S. patent application Ser. No. 11/039,548, filed Jan. 19, 2005 now U.S. Pat. No. 7,040,247, which claims the benefit of U.S. Provisional Application Ser. No. 60/539,922, filed Jan. 28, 2004, which is herein incorporated by reference.

FIELD OF THE INVENTION

The present invention relates to a mechanism for moving a surface in a desired orientation, and in particular to a mechanism for maintaining a surface such as a landing pad in a level orientation.

BACKGROUND OF THE INVENTION

In many environments, it is useful to have a surface which is level regardless of the orientation of the structure supporting the surface. For example, helicopters or other vehicles including fixed-wing Unmanned Aerial Vehicles (UAVs) and rotary-wing Vertical Take-off Unmanned Aerial Vehicles (VTUAVs) often need a level surface from which they can take off and land in a wide range of sea conditions. Providing such a surface is not a problem on land-based facilities or other structures that are secured to a solid surface such as oil drilling platforms that are anchored to a sea bed, etc. However, providing such a surface can be difficult when the object on which the aircraft is to land can move. For example, helicopters attempting to take off and land on ships are currently limited to a relatively narrow range of sea conditions in order to avoid injuring the aircraft and/or crew.

Given these problems, there is a need for a mechanism that can be operated to maintain a surface in a desired orientation regardless of the fact that the support for such a surface is not level and/or is moving.

SUMMARY OF THE INVENTION

To address the problems discussed above, the present invention is a mechanism for maintaining a surface in a desired orientation regardless of the orientation and/or movement of the supporting structure. For example, the mechanism may be located on a ship to maintain a landing pad in a substantially level orientation regardless of the movement of the ship in the water. In other embodiments, the mechanism may be used in a movable vehicle to maintain a stretcher or other equipment in a level orientation.

In one embodiment of the invention, the mechanism comprises at least two columns such as an upper and lower cylinder having a pair of engaging surfaces about which the cylinders rotate with respect to each other. The engaging surfaces are oriented at an angle with respect to a line perpendicular to the longitudinal axis of the cylinders. When the upper and lower cylinder sections rotate with respect to each other, the angle between the longitudinal axis of each cylinder varies. A surface to be maintained in a desired orientation is secured to the upper cylinder and is coupled to a structure that supports the cylinders through a linkage. The tilt of the surface is selectively adjusted by rotating the upper and lower cylinders with respect to each other. The upper and lower cylinders may be rotated by electric motors or hydraulic, or pneumatic pistons or other mechanisms. The orientation of the surface is adjusted by rotating the upper and lower cylinders with respect to the support structure.

In another embodiment of the invention, the engaging surfaces of the upper and lower cylinders are oriented in a direction that is perpendicular to the longitudinal axis of the cylinders. The upper and lower cylinders engage the surface to be maintained in a desired orientation and the supporting structure at an angle such that rotation of the upper cylinder with respect to the lower cylinder causes the tilt of the surface to change.

A position sensor, such as a gyroscope, measures the orientation of the surface or the supporting structure. Signals from the position sensor are fed to a computer or other processor that calculates the desired relative position of the upper and lower cylinders in order to maintain the surface in a desired orientation.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As indicated above, the present invention is a mechanism for maintaining a surface in a desired orientation when supported by a moving or non-level support structure.

Although the following discussion describes the invention for use in maintaining a surface such as a landing pad in a level orientation, it will be appreciated that the invention can be used in any environment where it is desirable to maintain a surface in a desired orientation despite the orientation or movement of the supporting structure. For example, the present invention can be used to keep beds or stretchers level inside an ambulance, helicopter or rescue plane, or can keep the entire patient cabin of the ambulance level during motion. Furthermore, the present invention can be used in hospital ships to stabilize the infirmary and surgery cabin. Alternatively, the present invention can be used in a medical laboratory to stabilize a centrifuge or to keep other equipment from breaking. Also, the present invention can be used with offshore drilling to keep construction equipment on a level surface. Also, the present invention can be used to keep appliances and accessories level in pleasure craft as in sailboats, or in a vessel, such as keeping the stove in the galley level. Furthermore, it can be used to stabilize guns and artillery mounted on a ship or a moving vehicle. The present invention could be used as an earthquake reducer of a pedestal, a cupboard, room or a small building as for example in a museum or for stabilizing cameras mounted in an unstable environment. The present invention can also be used to improve motion sickness by stabilizing a special cabin on a vehicle such as a train or in a vessel.

The present invention can also be used to selectively orient a surface such as a mirror to produce a light scanner, such as for bar codes. The present invention can be used as a ride in an amusement park, exercise or athletic equipment for balancing and for therapeutic message equipment. The invention can be used by mounting a spot light for special attractions and events. Also it can be used in industrial automation and machinery. The present invention could be used with floating foundations for bridges over water if the GPS speed to keep elevation constant improves. Furthermore, these various applications of the invention and potentially others can be built of any small or large size.

Figure 1:
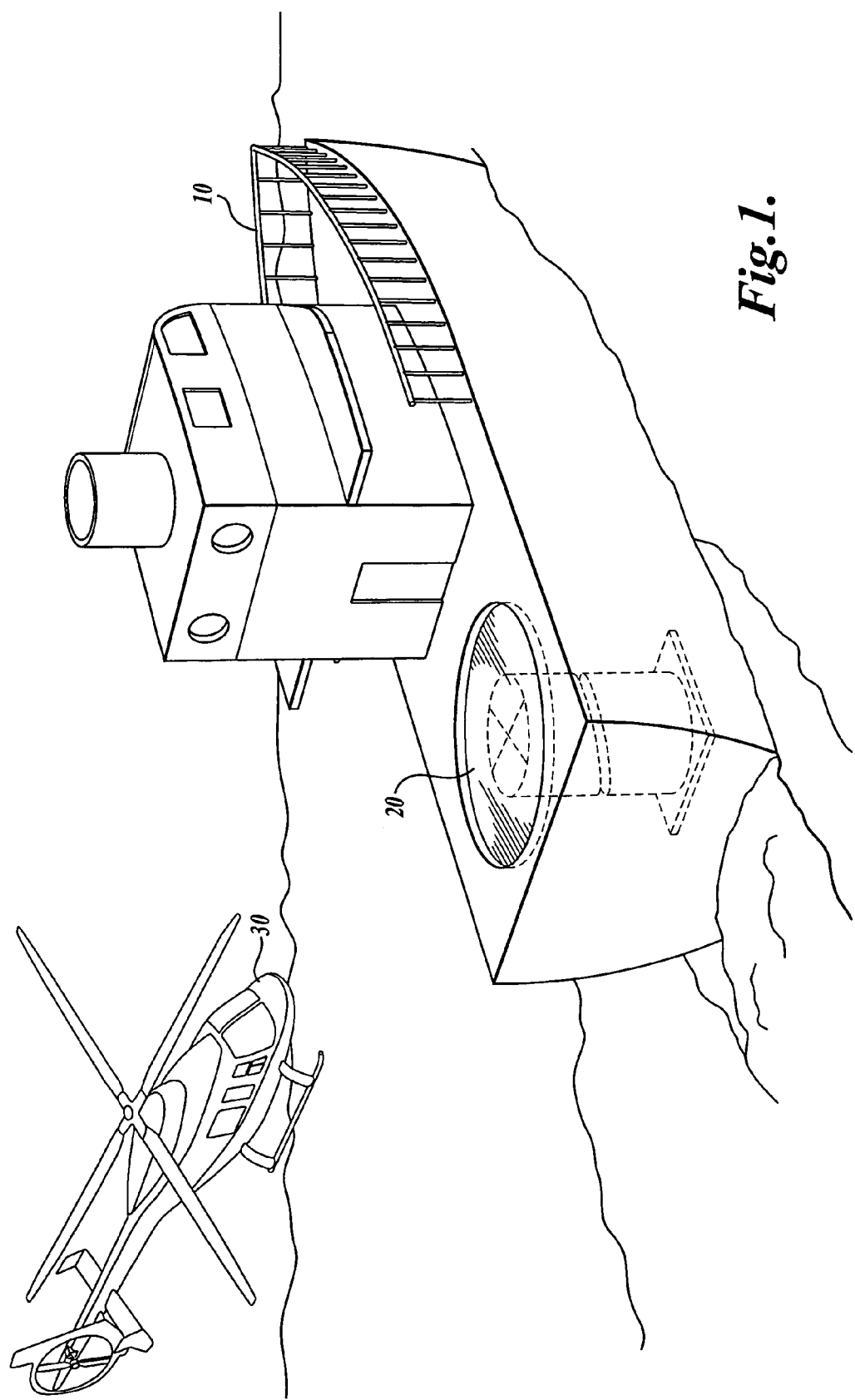
FIG. 1 illustrates one environment where the mechanism of the present invention may be used.

FIG. 1 illustrates one environment where the present invention may be used. In the example shown, a ship 10 has a landing pad 20 on its rear deck. The ship 10 may assume a variety of orientations due to wind, waves, load, or the like. The landing pad 20 is maintained in a level orientation by the present invention so that a helicopter 30 or other vehicle can land on the landing pad 20 under a variety of weather conditions or when the movement of the ship would cause a fixed landing pad to vary in orientation.

As will be explained in further detail below, position sensors on the ship or a dedicated position sensor that measures the orientation of the landing pad signals a computer system or programmed processor to adjust the pitch and roll of the landing pad 20 so that it is continually oriented in a substantially level plane.

Figure 2A:
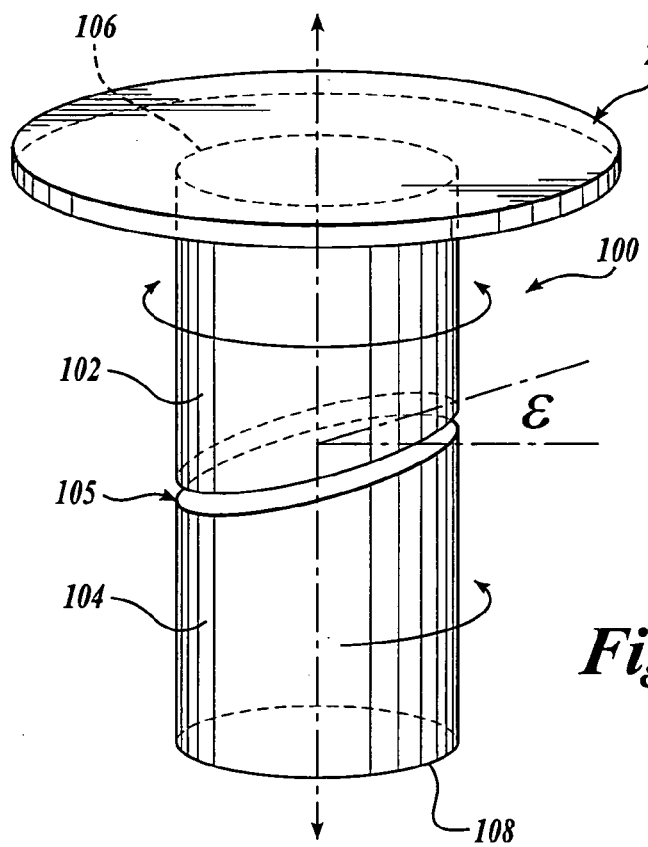
FIGS. 2A and 2B are simplified illustrations of a mechanism for maintaining a surface in a desired orientation in accordance with one embodiment of the present invention.
Figure 2B:
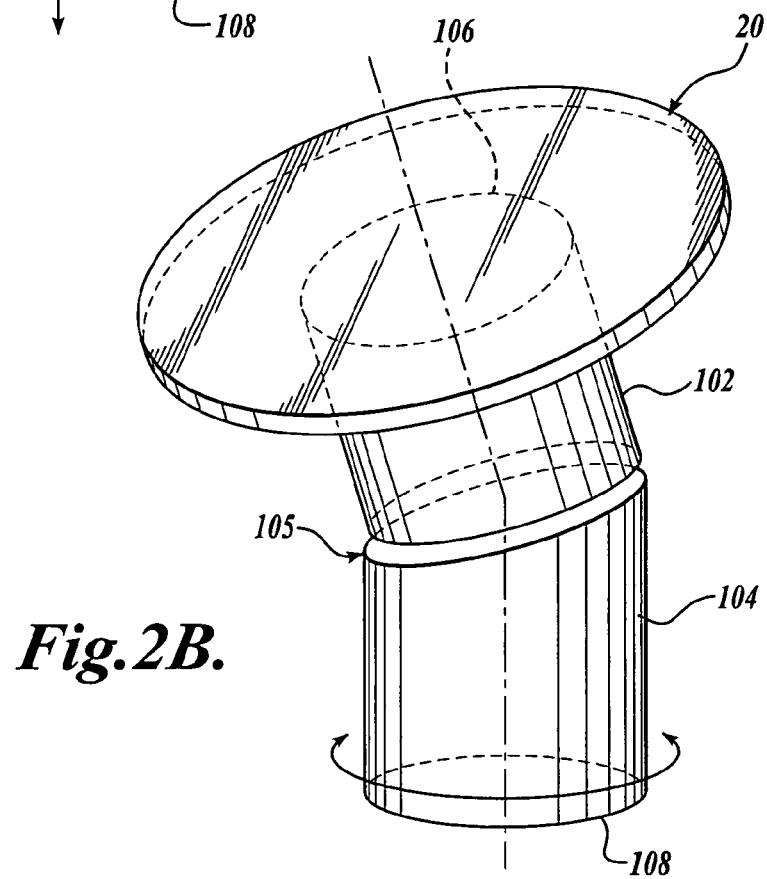

FIGS. 2A and 2B illustrate a simplified version of one embodiment of a mechanism for maintaining a surface in a desired orientation according to the present invention. The mechanism 100 includes at least two, and preferably a pair of columns comprising cylinders 102, 104 or other shapes that are rotatably engaged at an engaging surface 105 that cuts through the cylinders at an angle, $\epsilon$, with respect to a line that is perpendicular to the longitudinal axis of the cylinders 102, 104. A landing pad 20 is coupled to a top rim 106 of the upper cylinder 102 in a direction perpendicular to the longitudinal axis of the cylinder 102. A bottom rim 108 of the lower cylinder 104 is coupled to a structure that can move such as a ship deck or hull. As shown in FIG. 2B, by rotating the upper cylinder 102 with respect to the lower cylinder 104 about the angled engaging surface 105, the tilt of the landing pad 20 is varied if the position of the bottom cylinder 104 is fixed. Alternatively, the orientation of the lower cylinder 104 is changed if the orientation of the landing pad 20 is fixed. In the embodiment shown, the present invention operates by sensing the orientation of the supporting structure of the mechanism 100 or the orientation of the landing pad 20 and selectively positioning the upper cylinder 102 with respect to the lower cylinder 104 or vice versa and/or by rotating both cylinders together such that the landing pad 20 remains relatively level despite changes in the orientation of the structure that supports the cylinders.

Figure 3:
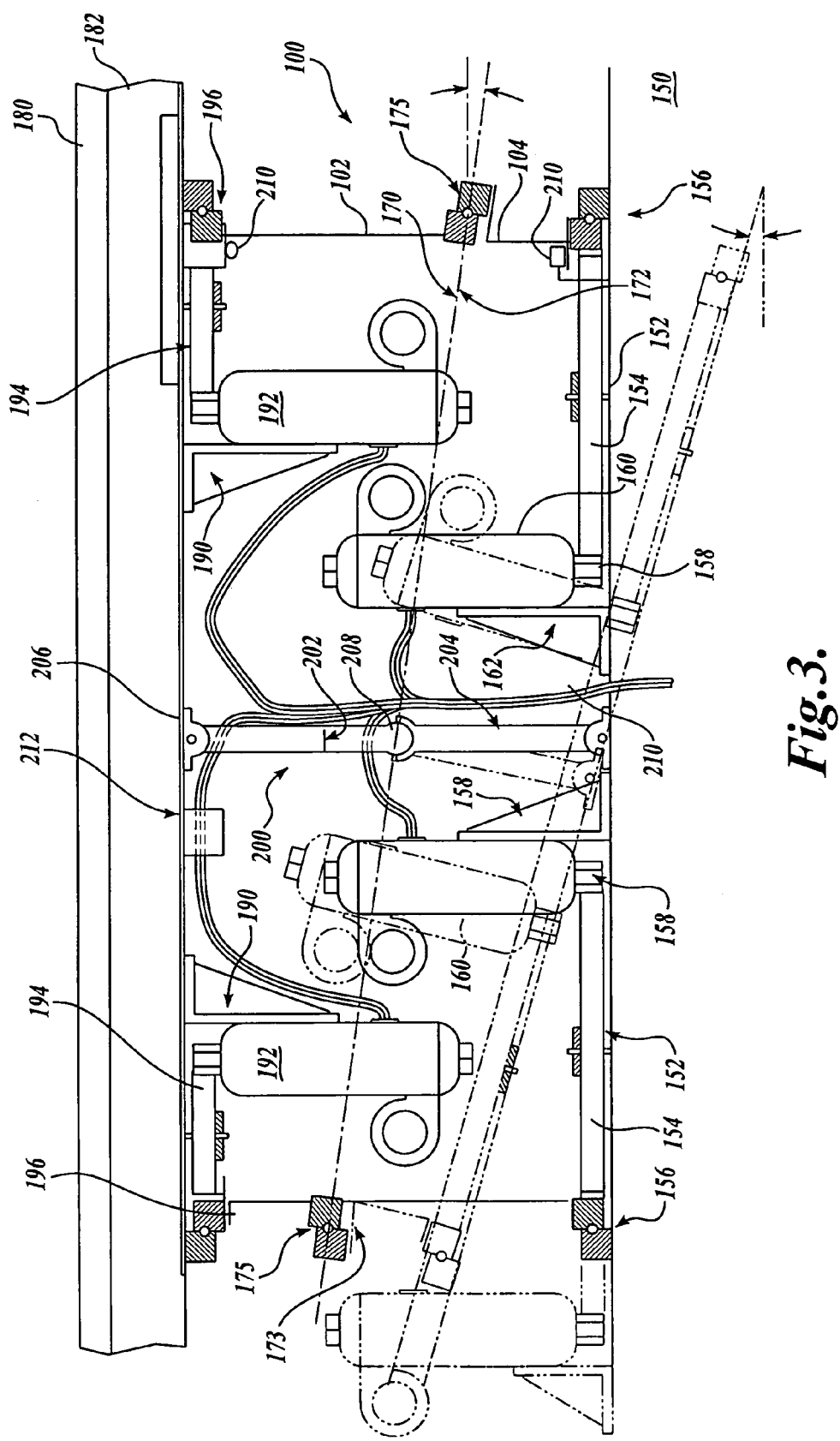
FIG. 3 is a cross-sectional view of one embodiment of a mechanism for maintaining a surface in a desired orientation in accordance with the present invention.

FIG. 3 is a cross-sectional view of one embodiment of a mechanism for maintaining the orientation of a surface such as a landing pad according to the present invention. As indicated above, the mechanism 100 includes an upper cylinder 102 that is rotatably coupled to a lower cylinder 104. The bottom of the lower cylinder 104 is supported on a surface 150 by a slew bearing 156 or other friction reducing mechanisms. In one embodiment, the bottom surface of the lower cylinder 104 includes one or more spur gears 154 that rotate the lower cylinder 104 within the slew bearing 156. A set of small slew bearings 152 support the spur gears 154 on the surface 150. On the outer radius of the spur gear 154 are a number of gear teeth (not shown) that engage gears 158 coupled to motors 160. The motors 160 are supported by motor brackets 162 that are in turn secured to the surface 150. The motors 160 cause the lower cylinder 104 to rotate within the slew bearing 156 in order to adjust the position of the lower cylinder 104 with respect to the surface 150.

The upper cylinder 102 and lower cylinder 104 are rotatably coupled at a pair of engaging surfaces 170, 172. Preferably, the engaging surface 172 of the lower cylinder 104 has a lip or ledge 173 that supports the engaging surface 170 of the upper cylinder 102. A slew bearing 175 supported by the lip 173 reduces friction between the engaging surfaces 170, 172. Preferably, the slew bearing 175 is secured to the cylinders to accommodate the slightly oval shape of the engaging surfaces 170, 172 in accordance with the angle at which they are cut through the cylinders 102, 104. Alternately, other mechanisms such as ball bearings, Teflon-coated surfaces or other mechanisms could be used to reduce friction between the two cylinders and replacing slew bearings 175 and slew bearings 156 and 196.

As indicated above, the angle of the engaging surfaces 170, 172 is offset with respect to a line perpendicular to the longitudinal axis of the cylinders 102 and 104. Therefore, by rotating the cylinders 102, 104 with respect to each other, the angle between the longitudinal axes of the top and bottom cylinders is varied. A landing pad 180 or other structure is supported on the top rim of the upper cylinder 102 by a number of beams 182 or other supports. Preferably, the landing pad 180 is oriented in a direction perpendicular to the longitudinal axis of the upper cylinder 102.

Supported by the beams 182 are one or more motor brackets 190 that hold motors 192. The motors 192 drive spur gears 194, which are mounted on small slew bearings similar to slew bearings 152 to engage a set of internal teeth of a slew bearing 196 that is positioned around the top rim of the upper cylinder 102. A portion of the slew bearing 196 around the upper cylinder is mounted on the bottom surface of the beams 182 to constrain the movement of the upper cylinder with respect to the beams 182 in a generally circular path.

The landing pad 180 is held in a fixed relation with respect to the surface 150 such that the frame of reference between the two remains fixed. A linkage 200 having a pair of link arms 202 and 204 couple the landing pad 180 to the surface 150. The link arm 202 is coupled at one end to the beams 182 with a hinge 206 and at the other end is coupled to the link arm 204 with a hinge 208. One end of the link arm 204 is coupled to the link arm 202 with the hinge 208 and at the other end is coupled to the surface 150 with a hinge 210. Each of the hinges preferably allow movement in a plane but not rotation in a plane. In one embodiment, each of the hinges 206, 208, 210 is a universal joint that maintains the frame of reference of the landing pad 180 and the surface 150. Also, the hinges 206, 208, 210 absorb the load caused by deflection of the landing pad 180. Operation of the motors 160 cause the upper and lower cylinders 102, 104 to rotate with respect to the surface 150. Similarly, operation of the motors 192 cause the upper cylinder 102 to rotate with respect to the bottom cylinder 104 in order to change the tilt of the landing pad 180.

Although the motors 160, 192 and their associated gears are shown on the interior of the two cylinders 102, 104, it will be appreciated that the motors or other mechanisms such as pneumatic or hydraulic pistons for rotating the cylinders could be located outside of the cylinders. However, it is generally preferable to locate the motors or other means on the interior of the surfaces to save space and to aid in protecting them from moisture or other harsh environments.

As indicated above, a position sensor such as a gyroscope 212 senses the position of the landing pad 180. The sensor can be mounted on the top or bottom deck. The signals from the gyroscope 212 are fed to a computer or other processor (not shown) that determines the appropriate amount by which the upper cylinder 102 should be rotated with respect to the lower cylinder 104. Once the desired tilt of the landing pad 180 has been obtained by appropriately adjusting the relative position of the upper cylinder 102 with respect to the lower cylinder 104, both cylinders 102, 104 can be moved by the motors 160 and 192 with respect to the surface 150 in order to orient the landing pad 180 in a desired direction.

In another embodiment, the position sensor 212 may be mounted to measure the orientation of the surface 150 such as the pitch and roll of a ship, stretcher, airplane, etc. The signals from the position sensor 212 are then used by a computer to adjust the relative positions of the cylinders to maintain the landing pad 180 in a substantially level orientation.

In the embodiment of the invention shown in FIG. 3, the engaging surfaces 170, 172 of the upper and lower cylinders 102, 104 are cut at an angle of 7.5° with respect to a line perpendicular to the longitudinal axis of the cylinders. Therefore, the maximum tilt that can be obtained between the two cylinders is 15°. However, it will be appreciated that other angles could be used to provide more or less tilt if desired.

FIG. 3 also shows a position sensor 210 such as a bar code reader that can be used on the upper and lower cylinder to determine the position of the cylinders with respect to the supporting surface 150 or the landing pad 180. Signals from the position sensors can be fed to a computer system to adjust the position of the cylinders if necessary.

Figure 4:
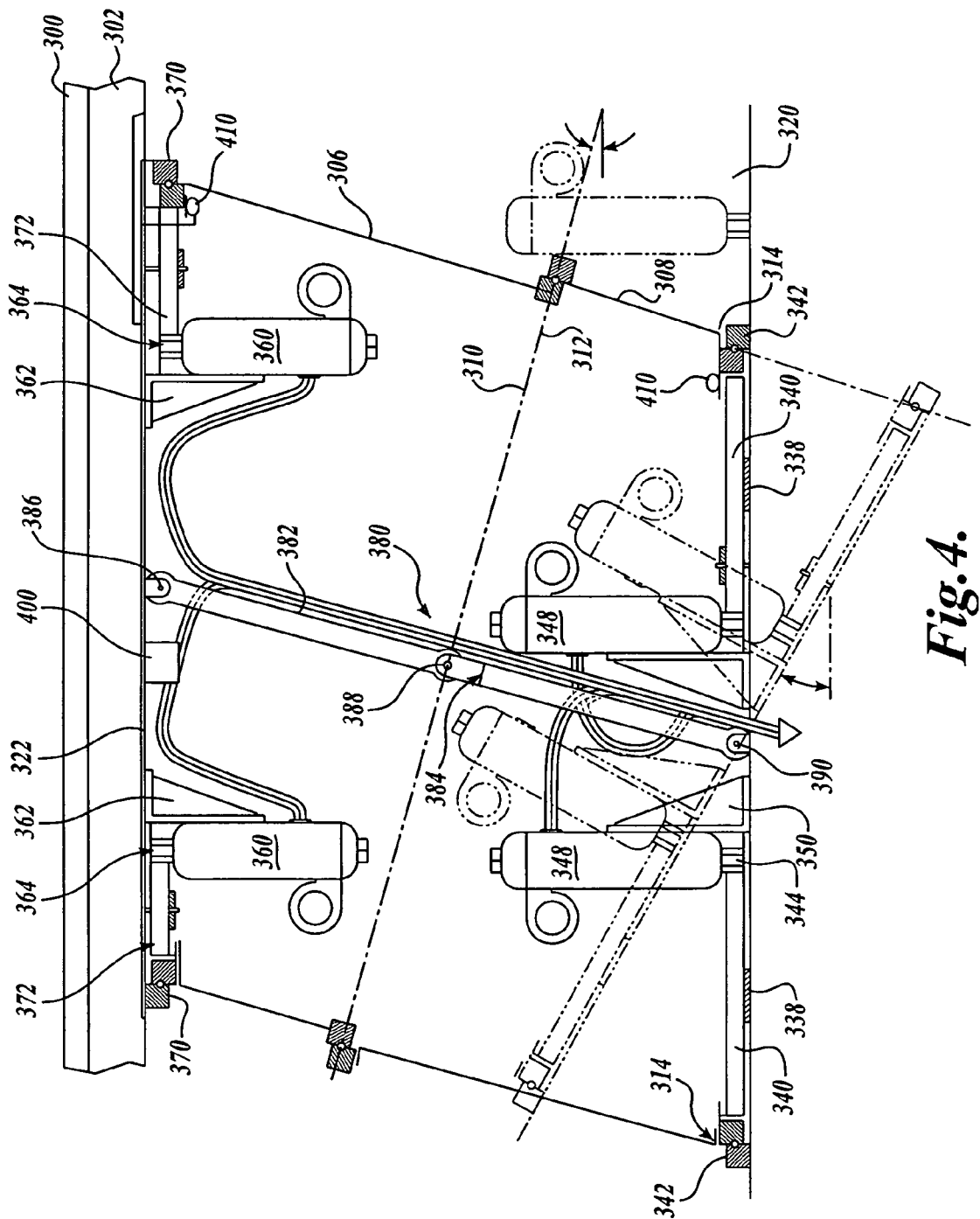
FIG. 4 illustrates another embodiment of a mechanism for maintaining a surface in a desired orientation in accordance with the present invention.

FIG. 4 illustrates another embodiment of a mechanism for maintaining a surface in a desired orientation in accordance with the present invention. In this embodiment, a surface such as a landing pad 300 is supported by a number of beams 302 or other support structures that maintain the surface relatively flat. Supporting the beams 302 above a surface 320 are a pair of cylinders 306, 308. An upper cylinder 306 and a lower cylinder 308 have a pair of engaging surfaces 310, 312 about which the two cylinders rotate with respect to each other.

In this embodiment, the engaging surfaces 310, 312 are cut through the cylinders at an angle that is perpendicular to the longitudinal axis of the cylinders. The lower cylinder 308 has a bottom surface or rim 314 that engages the surface 320 via a slew bearing 342 and the upper cylinder 306 includes a top surface or rim 322 that engages the bottom surface of the beams 302 via a slew bearing 370. In this embodiment, the bottom surface or rim 314 of the lower cylinder 308 and the top surface or rim 322 of the upper cylinder 306 are angled with respect to a line perpendicular to the longitudinal axis of the cylinders.

As with the previously described embodiment, the lower cylinder 308 has a spur coupled to the lower cylinder 308 to accommodate the slight oval shape of the bottom rim of the lower cylinder that engages the surface 320. An outer diameter of the spur gear 340 has gear teeth (not shown) that engage gears 344 of a pair of motors 348. The motors 348 are secured by a motor bracket 350 to the surface 320. Operation of the motors 348 cause the spur gear to rotate and to move the lower cylinder 308 and the upper cylinder 306 in the slew bearing 342 with respect to the surface 320.

On the top surface, the beams 302 support one or more motors 360 with motor brackets 362. Gears 364 of the motors 360 engage a spur gear 372 that in turn meshes with a geared slew bearing 370 that surrounds the top rim of the upper cylinder 306. The spur gear 372 is supported by a set of small slew bearings similar to slew bearings 338. The slew bearing 370 constrains the movement of the upper cylinder to rotation with respect to the beams 302. As with the slew bearing 342, the slew bearing 370 should be coupled to the upper cylinder to allow for the slightly oval shape of the top rim 322 of the upper cylinder 306.

Coupling the landing pad 300 to the fixed surface 320 is a linkage mechanism 380 including a pair of arms 382, 384. The arm 382 is coupled to the beams 302 with a movable hinge joint 386 and to the arm 384 with a movable hinge joint 388. The arm 384 is coupled at one end to the arm 382 at the hinge joint 388 and at the other end to the surface 320 with a hinge joint 390. In one embodiment, the hinge joints 386, 388 and 390 allow movement in a single plane but not rotation of the plane. In one embodiment, the hinge joints 386, 388 and 390 are universal joints. The hinge joints 386, 388 and 390 also absorb the load caused by deflection of the landing pad 300.

Although the embodiments shown above use three universal joints to couple the top surface to the supporting surface, it will be appreciated that the embodiment shown in FIG. 3 may be constructed with a single universal joint and the embodiment shown in FIG. 4 could be constructed with two universal joints, depending on the expected load the system is designed to carry. Similarly, although the disclosed embodiments use spur gears to couple the motors to the gears of the slew bearings, it will be appreciated that other gear arrangements could be used to drive the cylinders.

A position sensor 400, such as a gyroscope, provides signals regarding the orientation of the landing pad 300. The sensor can be mounted on the top or bottom deck. Signals from the sensor 400 are provided to a computer or programmed processor (not shown) that calculates how the upper and lower cylinders 306, 308 should be rotated with respect to each other and with respect to the surface 320 in order to adjust the relative position or tilt of the landing pad 300. As described above, the cylinders 306, 308 are rotated relative to each other in order to maintain the landing pad 300 in a relatively level orientation. Relative movement of the upper cylinder 306 with respect to the lower cylinder 308 causes the tilt of the landing pad 300 to change. The direction of tilt can be changed by rotating the lower cylinder 308 and the upper cylinder 306 together with respect to the surface 320 using the motors 348 and 360.

Although the described embodiments have the position sensors 212, 400 on the landing pad or coupled thereto, will be appreciated that the sensors could also be placed so that they determine the orientation of the surface supporting the cylinders. In this configuration, signals from the sensors are supplied to a computer or programmed processor to determine how the two cylinders should be rotated with respect to each other in order to adjust the tilt and orientation of the landing pad such that the landing pad is maintained substantially level.

The level adjusting mechanism shown in FIG. 4 may also include a position sensor such as an optical bar code reader 410 to determine the position of the cylinders with respect to the landing pad and the supporting surface. Signals from the position sensors 210, 410 are fed to the computer system in order to aid in confirming that the cylinders have been correctly aligned to keep the landing pad level.

Figure 5A:
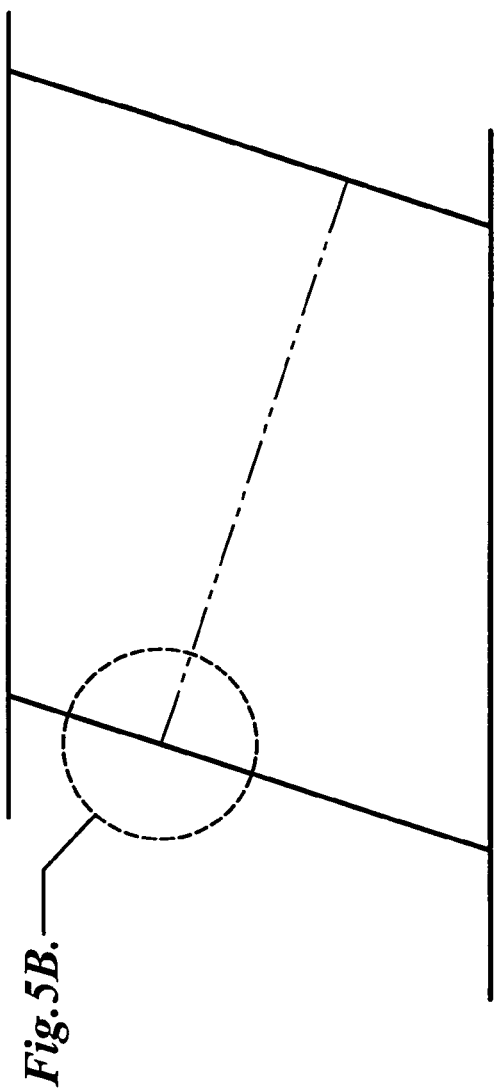
FIGS. 5A and 5B illustrate one embodiment of a bearing surface between a first and a second cylinder.
Figure 5B:
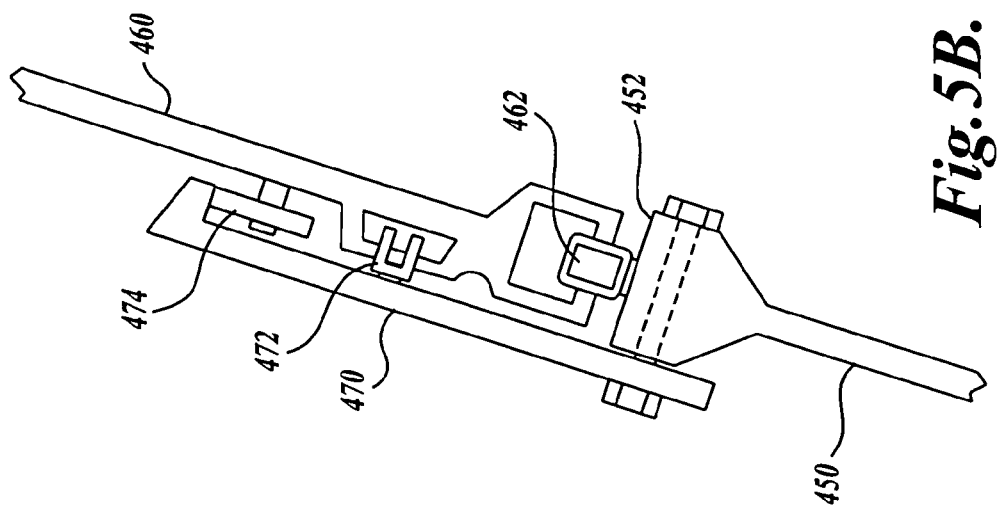

FIGS. 5A and 5B illustrate one mechanism for reducing friction between the two engaging surfaces of the cylinders. The engaging surface of the lower cylinder wall 450 has a rim with a widened top surface 452 on which the upper cylinder rests. A number of wheels 462 are integrated or secured to the engaging surface of the upper cylinder and ride on the widened surface 452. If the engaging surfaces of cylinders are oriented at an angle with respect to the longitudinal axis of the cylinders, then the widened rim should have a width which allows for the slightly oval shape of the two engaging surfaces while still allowing them to rotate with respect to each other. A cover 470 forms a shallow U-shaped channel over the engaging surfaces to prevent the upper cylinder from slipping off the lower cylinder. The cover 470 is secured to the outer diameter of the upper or lower cylinder. A wheel 472 or other bearing is oriented radially outward from the upper cylinder to reduce friction between the cylinders. A second wheel 474 rides within the U-shaped channel and helps maintain the alignment of the cylinders. The cover 470 therefore reduces friction between the cylinders and helps maintain their alignment as the cylinders rotate with respect to each other.

As indicated above, the present invention operates by adjusting the relative orientation of the cylinders in order to maintain the surface secured to the upper cylinder in a desired orientation. To determine the desired position of the upper cylinder with respect to the lower cylinder, signals from the position sensor are fed to a computer or programmed processor that converts the signals into a desired position of the cylinders. The following describes one possible technique for performing the transformation of sensor signals to desired cylinder positions. However, it is understood that other mathematical transforms could also be used.

Figure 10A:
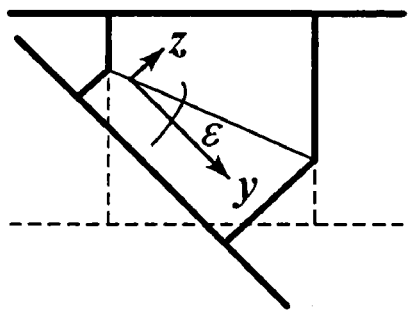
FIGS. 10A–10C illustrate orientations of the mechanism for deriving formulas to change a position signal to desired relative positions of the cylinders.

For the embodiment shown in FIG. 3, the mechanism is a cylinder cut in the center with an angle $\epsilon$ and it rotates at the bottom, top, and inclined surface. See FIG. 10A.

The mathematical transformation can be found as follows: from geometry starting with the plane on the middle surface the plane equation is:

$$-y \tan \epsilon + z = 0 \tag{1}$$

With the axis at the middle surface, rotation in the xy plane in the x-axis by an angle $\beta$ yields the following plane equation:

$$-x \sin \beta - y \cos \beta + z \cot \epsilon = 0 \tag{2}$$

Thus, $\beta$ is the angle describing the rotation of both cylinders against each other to achieve the tilt. Now rotate in the yz-plane the y-axis by an angle $\epsilon$ so that the xy-plane can coincide with the vertical. Thus, the plane equation becomes:

$$-x \sin \beta + y(1-\cos \beta)\cos \epsilon + z(\sin \epsilon \cos \epsilon + \cos \epsilon \cot \epsilon) = 0 \tag{3}$$

Thus at $\beta=0$ $z=0$ and $\beta=\pm\pi$ $z=-y \tan 2\epsilon$ the maximum slope with the y axis rotated by $\pm\pi$.

Now, rotate in the xy plane the x-axis by an angle $\alpha$ to yield the plane equation:

$$x\{-\cos \alpha \sin \beta + (1-\cos \beta)\cos \epsilon \sin \alpha\} + y\{\sin \alpha \sin \beta + (1-\cos \beta)\cos \epsilon \cos \alpha\} + z(\sin \epsilon \cos \beta + \cos \epsilon \cot \epsilon) = 0 \tag{4}$$

Thus, $\alpha$ is the angle describing the location of the tilt due to rotating both cylinders together.

The plane equation with respect to the tilt values from the position sensor with the same frame of reference is:

$$x \tan z_1 + y \tan z_2 + z = 0 \tag{5}$$

Where $z_1$ and $z_2$ are the tilt in the x and y direction with respect to the bottom surface where the sensor is at the bottom surface.

Matching Eq. 5 with Eq. 4 yields $$\tan z_1 = \frac{-\cos\alpha\sin\beta + (1-\cos\beta)\cos\epsilon\sin\alpha}{\sin\epsilon\cos\beta + \cot\epsilon\cos\epsilon} \tag{6}$$

and $$\tan z_2 = \frac{-\sin\alpha\sin\beta + (1-\cos\beta)\cos\epsilon\cos\alpha}{\sin\epsilon\cos\beta + \cot\epsilon\cos\epsilon} \tag{7}$$

From Eq. 6 and Eq. 7 they can be rewritten as:

$$\tan z_1 = -a_1 \cos\alpha + a_2 \sin\alpha \tag{8}$$

$$\tan z_2 = a_1 \sin\alpha + a_2 \cos\alpha \tag{9}$$

Where:

$$a_1 = \frac{\sin\beta}{\sin\epsilon\cos\beta + \cot\epsilon\cos\epsilon} \tag{10}$$

$$a_2 = \frac{(1-\cos\beta)\cos\epsilon}{\sin\epsilon\cos\beta + \cot\epsilon\cos\epsilon} \tag{11}$$

From squaring Eq. 8 and Eq. 9 $\alpha$ is eliminated as follows:

$$\tan^2 z_1 + \tan^2 z_2 = a_1^2 + a_2^2 \tag{12}$$

Or $$\tan^2 z_1 + \tan^2 z_2 = \frac{\sin^2\beta + (1-\cos\beta)^2\cos^2\epsilon}{(\sin\epsilon\cos\beta + \cot\epsilon\cos\epsilon)^2}$$

Solving for $\alpha$ from Eq. 8 and 9 yields:

$$\sin\alpha = \frac{a_2\tan z_1 + a_1\tan z_2}{\tan^2 z_1 + \tan^2 z_2} \quad (13)$$

$$\cos\alpha = \frac{-a_1\tan z_1 + a_2\tan z_2}{\tan^2 z_1 + \tan^2 z_2} \quad (14)$$

Substituting $\sin^2 \beta = 1-\cos^2 \beta$ in Eq. 12 and solve for $\beta$ from the quadratic equation yields:

$$\beta = \pm\cos^{-1}\left\{\left[\frac{1}{\sqrt{\tan^2 z_1 + \tan^2 z_2 + 1}} - \cos^2\varepsilon\right]\frac{1}{\sin^2\varepsilon}\right\} \quad (15)$$

And from Eq. 13 a has two roots $\alpha_1$ and $\alpha_2$ $$\alpha_1 = \sin^{-1}\left\{\frac{\sqrt{d+1}}{d}\sin\varepsilon\,[\sin\beta\tan z_2 + (1-\cos\beta)\cos\varepsilon\tan z_1]\right\} \quad (16)$$

$$d = \tan^2 z_1 + \tan^2 z_2 \quad (17)$$

$$\alpha_2 = \pi - \alpha_1 \quad (18)$$

For the embodiment shown in FIG. 4, the mathematics required to perform the transformation of the position signals to the relative positions of the cylinders is slightly different.

Starting with the sensor signals it is sufficient to derive the mathematics using a surface simulating the rotation of the vessel. Consider $z_1$ and $z_2$ to be the angle representation of the rotation of the middle plane in the xz-plane and yz-plane respectively. Thus the plane surface can be obtained:

$$x \tan z_1 + y \tan z_2 + z = 0 \quad (19)$$

Where x, y and z are the axis in the center of the gyroscope and z is the vertical axis aligned with gravity. Thus, the sensor is mounted on top.

Figure 10B:
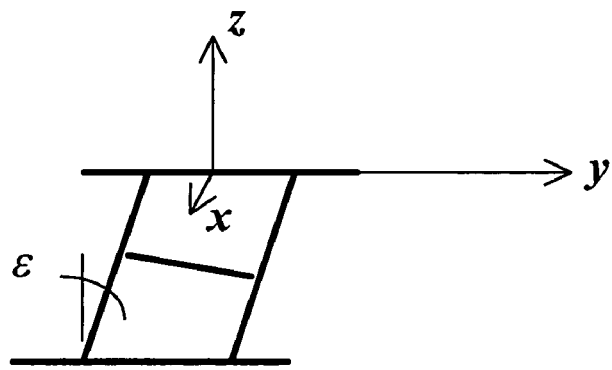

For the embodiment shown in FIG. 4, the change of height, h, on the perimeter of the cylinder due to a $\beta$ rotation in the middle incline is $$h = h_0 + R[\sin(\theta+\beta) - \sin\theta]\tan\varepsilon \quad (20)$$

and the rotated ellipse on the top surface is $$\left(\frac{x\cos\beta - y\sin\beta}{R}\right)^2 + \left(\frac{x\sin\beta + y\cos\beta}{R\sec\varepsilon}\right)^2 = 1 \quad (21)$$

Where $h_0$ is the original height of the cylinder before cutting it, R is the radius of the cylinder, $\varepsilon$ is the cut angle or the inclination angle from the vertical and $\theta$ is the polar coordinate as shown in FIG. 10B. Thus, $\beta$ is the angle describing the rotation of both cylinders against each other to achieve the tilt.

Thus from Eq. 20, we have

@$\theta=-90°$ $h_1 = h_0\beta R \cos\beta \tan\varepsilon + R \tan\varepsilon$ (22)

@$\theta=+90°$ $h_2 = h_0 + R \cos\beta \tan\varepsilon - R \tan\varepsilon$ (23)

$\Delta h = h_2 - h_1 = 2R(\cos\beta - 1)\tan\varepsilon$ (24)

and from Eq. 21 @ x=0:

$$y_0 = \frac{R}{\sqrt{\sin^2\beta + \cos^2\beta\cos^2\varepsilon}} \quad (25)$$

Figure 10C:
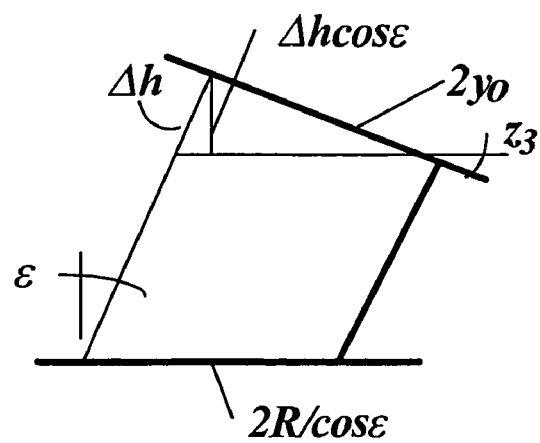

As shown in FIG. 10C, $$\sin z_3 = \frac{\Delta h\cos\varepsilon}{2y_0} = (\cos\beta - 1)\sin\varepsilon\sqrt{\sin^2\beta + \cos^2\beta\cos^2\varepsilon} \quad (26)$$

Similarly from Eq. 20, we have

@$\theta=0$ $h_3 = h_0 + R \sin\beta \tan\varepsilon$ (27)

@$\theta=180°$ $h_4 = h_0 - R \sin\beta \tan\varepsilon$ (28)

$\Delta h = h_3 - h_4 = 2R \sin\beta \tan\varepsilon$ (29)

and from Equation 21 at y=0:

$$x_0 = \frac{R}{\sqrt{\cos^2\beta + \sin^2\beta\cos^2\varepsilon}} \quad (30)$$

But $$\sin z_4 = \frac{\Delta h\cos\varepsilon}{2x_0} = \sin\beta\sin\varepsilon\sqrt{\cos^2\beta + \sin^2\beta\cos^2\varepsilon} \quad (31)$$

Where $z_3$ is the slope in the yz-plane, $z_4$ is the slope in the xz-plane, $(0, y_0)$ and $(x_0, 0)$ are the new coordinates on the axes when the top surface ellipse rotates by an angle $\beta$. Thus, the plane equation for this embodiment can be described as:

$$x \tan z_4 + y \tan z_3 + z = 0 \quad (32)$$

Where the coordinate axis sits on the center of the unstable surface. Rotating the axis on the top surface of the mechanism in the xy-plane an angle $\alpha$ corresponds to the rotation of the bottom plate of the mechanism to orient the tilt in the desired direction. Thus, the plane equation becomes:

$$(x\cos\alpha - y\sin\alpha)\tan z_4 + (x\sin\alpha + y\cos\alpha)\tan z_3 + z = 0 \quad (33)$$

or $$(\tan z_4 \cos\alpha + \tan z_3 \sin\alpha)x + (-\tan z_4 \sin\alpha + \tan z_3 \cos\alpha)y + z = 0 \quad (34)$$

Now, Eq. 19 and Eq. 34 must match. Thus $$\tan z_1 = \tan z_4 \cos\alpha + \tan z_3 \sin\alpha \quad (35)$$

and $$\tan z_2 = -\tan z_4 \sin\alpha + \tan z_3 \cos\alpha \quad (36)$$

So, if given $z_1$ and $z_2$, a and $\beta$ can be found using Eq. 26, Eq. 31, Eq. 35 and Eq. 36. These two nonlinear equations with two unknowns can be solved using iterative technique or from a possible derived closed form solution. Alternatively, instead of using iterative method a lookup table will be derived for $\beta$.

From Eq. 35 & Eq. 36 we have the following two equations:

$$\cos\alpha \tan z_4 + \sin\alpha \tan z_3 = \tan z_1 \quad (37)$$

$$-\sin\alpha \tan z_4 + \cos\alpha \tan z_3 = \tan z_2 \quad (38)$$

Multiply Eq. 37 by sin α and multiply Eq. 38 by cos α and add yields $$\sin^2 \alpha \tan z_3 + \cos^2 \alpha \tan z_3 = \tan z_1 \sin \alpha + \tan z_2 \cos \alpha \quad (39)$$

or $$\sin \alpha \tan z_1 + \cos \alpha \tan z_2 = \tan z_3 \quad (40)$$

Multiply Eq. 37 by cos α and multiply Eq. 38 by sin α and subtract yields $$\cos^2 \alpha \tan z_4 + \sin^2 \alpha \tan z_4 = \tan z_1 \cos \alpha - \tan z_2 \sin \alpha \quad (41)$$

or $$\cos \alpha \tan z_1 - \sin \alpha \tan z_2 = \tan z_4 \quad (42)$$

Multiply Eq. 40 by tan $z_2$ and multiply Eq. 42 by tan $z_1$ and add yields $$\cos \alpha \tan^2 z_2 + \cos \alpha \tan^2 z_1 = \tan z_3 \tan z_2 + \tan z_4 \tan z_1 \quad (43)$$

or $$\cos \alpha = \frac{\tan z_3 \tan z_2 + \tan z_4 \tan z_1}{\tan^2 z_1 + \tan^2 z_2} \quad (44)$$

Multiply Eq. 40 by tan $z_1$ and multiply Eq. 42 by tan $z_2$ and subtract yields $$\sin \alpha \tan^2 z_2 + \sin \alpha \tan^2 z_1 = \tan z_3 \tan z_1 - \tan z_4 \tan z_2 \quad (45)$$

or $$\sin \alpha = \frac{\tan z_3 \tan z_1 - \tan z_4 \tan z_2}{\tan^2 z_1 + \tan^2 z_2} \quad (46)$$

Eliminate α from Eq. 44 and Eq. 46 using the identity $\sin^2\alpha + \cos^2\alpha = 1$ yields:

$$(\tan z_3 \tan z_2 + \tan z_4 \tan z_1)^2 + (\tan z_3 \tan z_1 - \tan z_4 \tan z_2)^2 = (\tan^2 z_1 + \tan^2 z_2)^2 \quad (47)$$

Squaring the terms and simplifying yields:

$$\tan^2 z_3 + \tan^2 z_4 = \tan^2 z_1 + \tan^2 z_2 \quad (48)$$

or $$\sec^2 z_3 + \sec^2 z_4 = \sec^2 z_1 + \sec^2 z_2 \quad (49)$$

From Eq. 26 and Eq. 31 yields $$\frac{1}{1 - (\cos\beta - 1)^2 \sin^2 \varepsilon (\sin^2 \beta + \cos^2 \beta \cos^2 \varepsilon)} + \frac{1}{1 - \sin^2 \beta \sin^2 \varepsilon (\cos^2 \beta + \sin^2 \beta \cos^2 \varepsilon)} = \sec^2 z_1 + \sec^2 z_2 \quad (50)$$

To expedite the algorithm make a table of β versus the left hand of Eq. 50 and pre-store the values in memories before hand. Then, for a given $z_1$ and $z_2$ calculate the right hand side of Eq. 50 and lookup the stored table using binary search algorithm to find the corresponding ±β. Thus, based on the previous value of β the closest β of the two is chosen per minimum energy. Finally, α is calculated from Eq. 44 or Eq. 46. Where tan $z_3$=sin $z_3/\sqrt{1-\sin^2 z_3}$ and tan $z_4$=sin $z_4/\sqrt{1-\sin^2 z_4}$, sin $z_3$ & sin $z_4$ are taken from Eq. 26 and Eq. 31.

As an alternative to calculating the desired orientation of the cylinders, it will be appreciated that the system could be programmed to respond by moving the cylinders incrementally in response to changes in the position sensor.

For the efficiency regarding the necessary tangential force to turn each cylinder: If the coefficient of friction for the bearings specified by manufacturing is 2%, thus 4% for two ball bearing, then an upper bound formula for maximum tangential force necessary to turn each cylinder can be as follows:

Top Cylinder: Force=0.04 $P2+e$ sin($\epsilon$)$P1/R$

Bottom Cylinder: Force=0.04 $P3+e$ sin($2\epsilon$)$P1/R$

Figure 6:
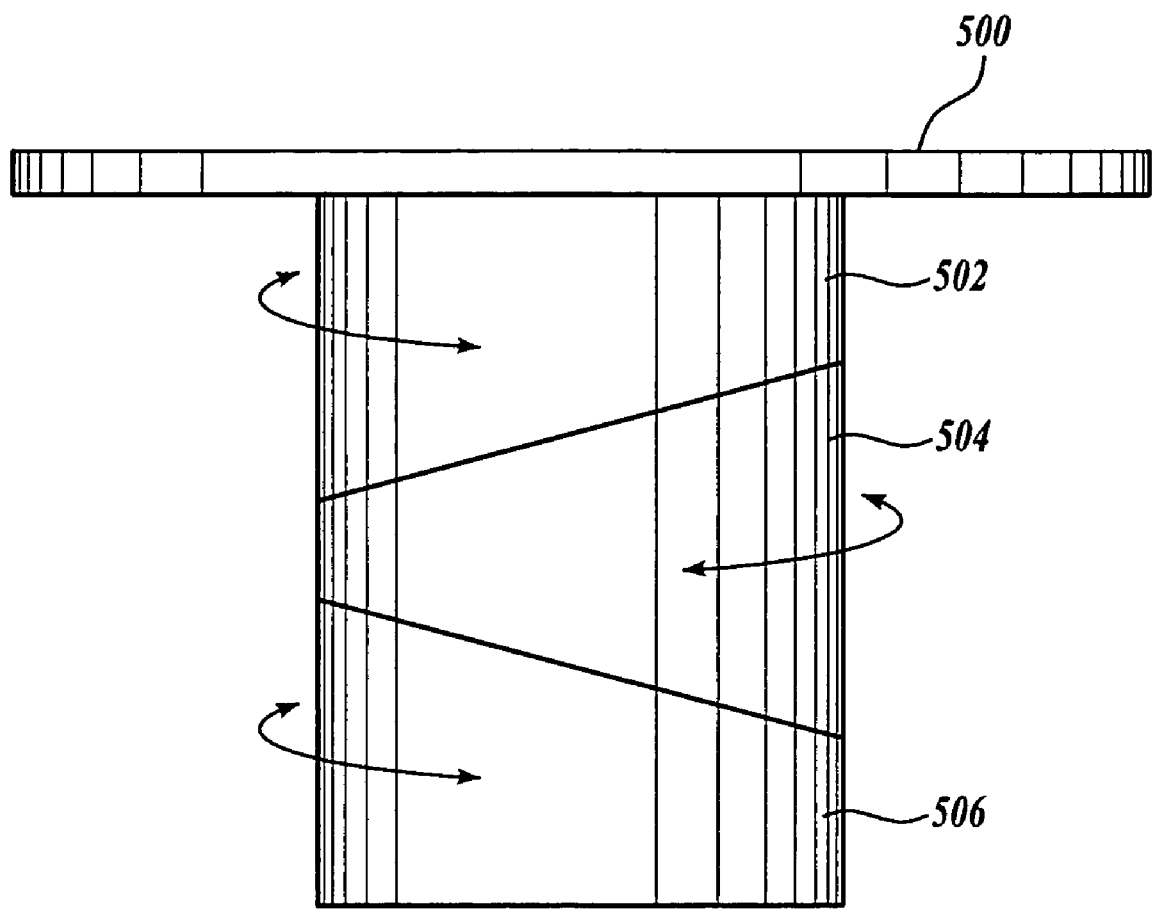
FIG. 6 illustrates an embodiment of the invention having three cylinders.

Where:
P1=Weight of Helicopter only or pay load only
P2=Total load above the middle bearing.
P3=Total load above the bottom bearing
e=eccentricity in ft (if the helicopter is at off center- or distance to resultant load)
R=radius of the slew bearing in ft
$\epsilon$=design angle for maximum tilt=$2\epsilon$ Although the described embodiments of the invention use a pair of cylinders, it will be appreciated that the mechanism could include additional cylinders. For example, FIG. 6 illustrates another alternative embodiment of the invention. In this embodiment, a surface 500 is maintained in a desired orientation by three or more cylinders 502, 504, 506. Each of these cylinders is rotatable in a manner similar to that described above to adjust the angle between the cylinders and to maintain a surface in a desired orientation.

Figure 7:
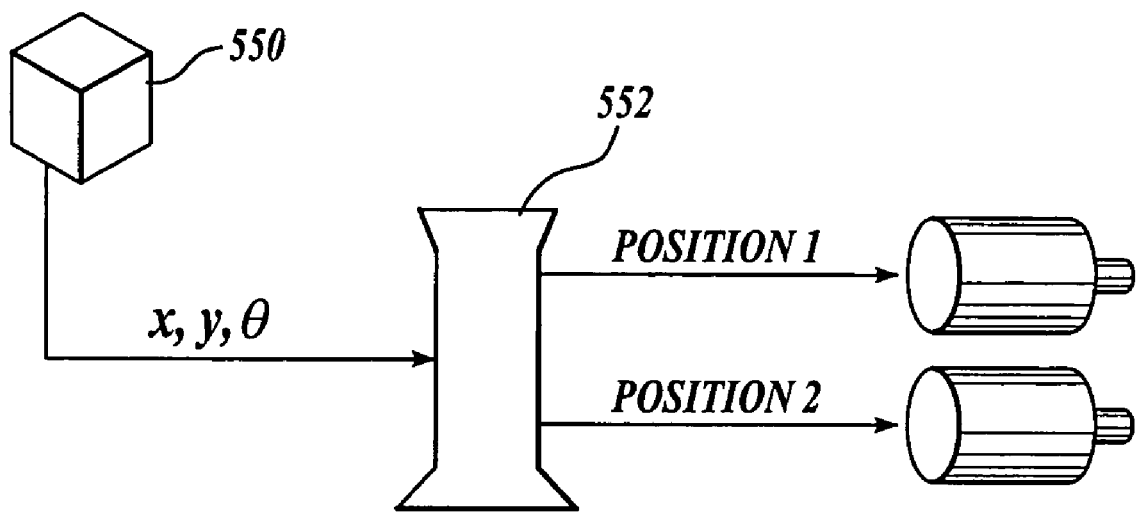
FIG. 7 illustrates an embodiment of a computer system used in a mechanism of the present invention.

FIG. 7 illustrates one embodiment of a computer system 552 that receives position signals from a position sensor 550 that detects the orientation of the surface to be adjusted or a supporting surface such as the hull of a ship. The computer 552 converts the position signals into a desired position of the cylinders with respect to each other and a desired position of the cylinders with respect to a supporting surface. The computer then generates motor control signals labeled position 1, position 2 that are fed to the motors, hydraulic or pneumatic pistons or similar devices to move the cylinders to their desired position such that the orientation of the surface in question is maintained or positioned as desired.

Figure 8:
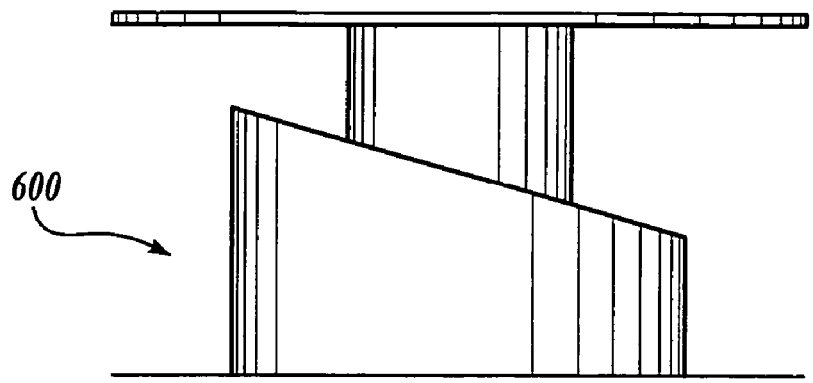
FIG. 8 illustrates an embodiment of the invention having a pair of cylinders with unequal diameters.

Although the previously described embodiments employ two cylindrical sections of substantially equal diameter to support a surface this is not required. For example, FIG. 8 illustrates a mechanism 600 having cylinders of unequal diameters that can be used to vary the orientation of a surface secured to the top cylinder.

Figure 11:
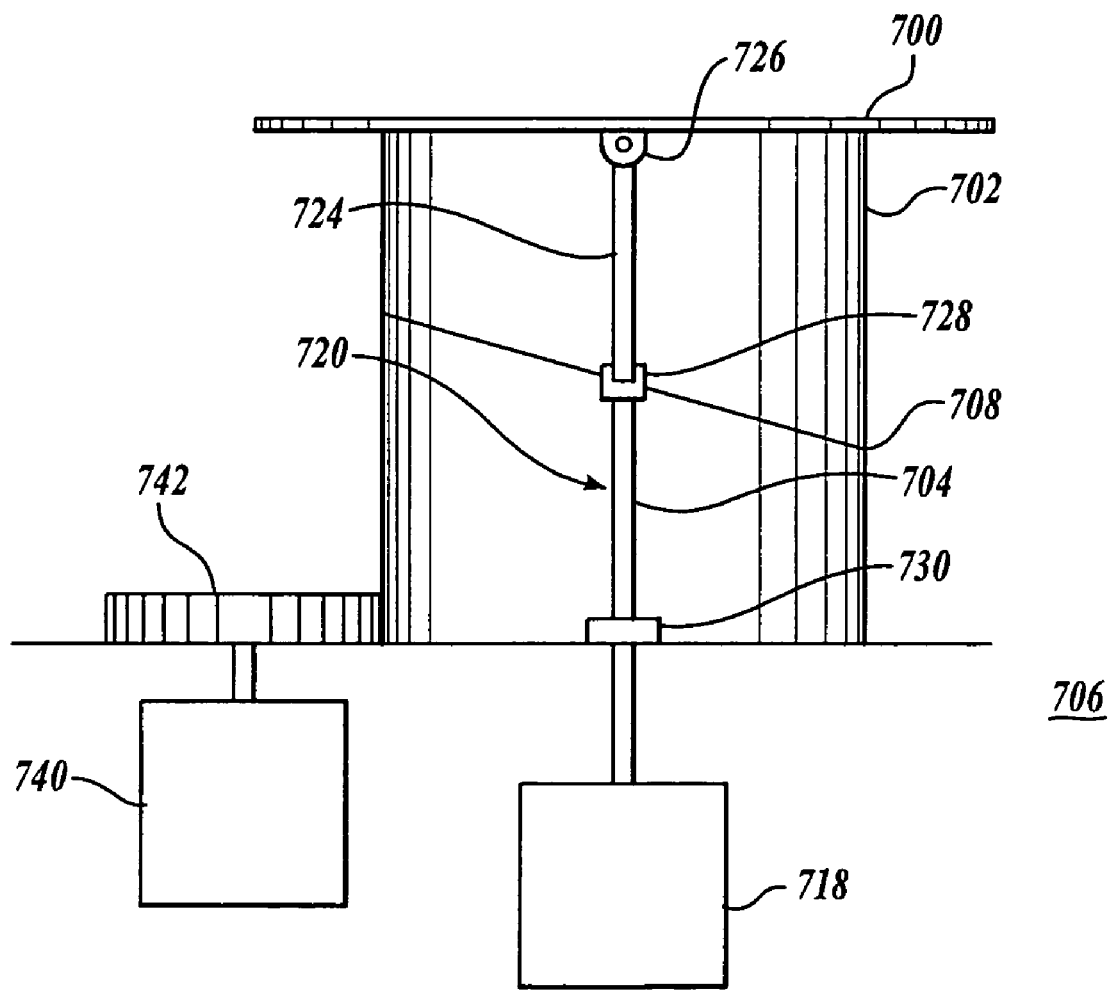
FIG. 11 shows yet another embodiment of the invention that can be used to move a mirror or other surface in a desired orientation.
Figure 12:
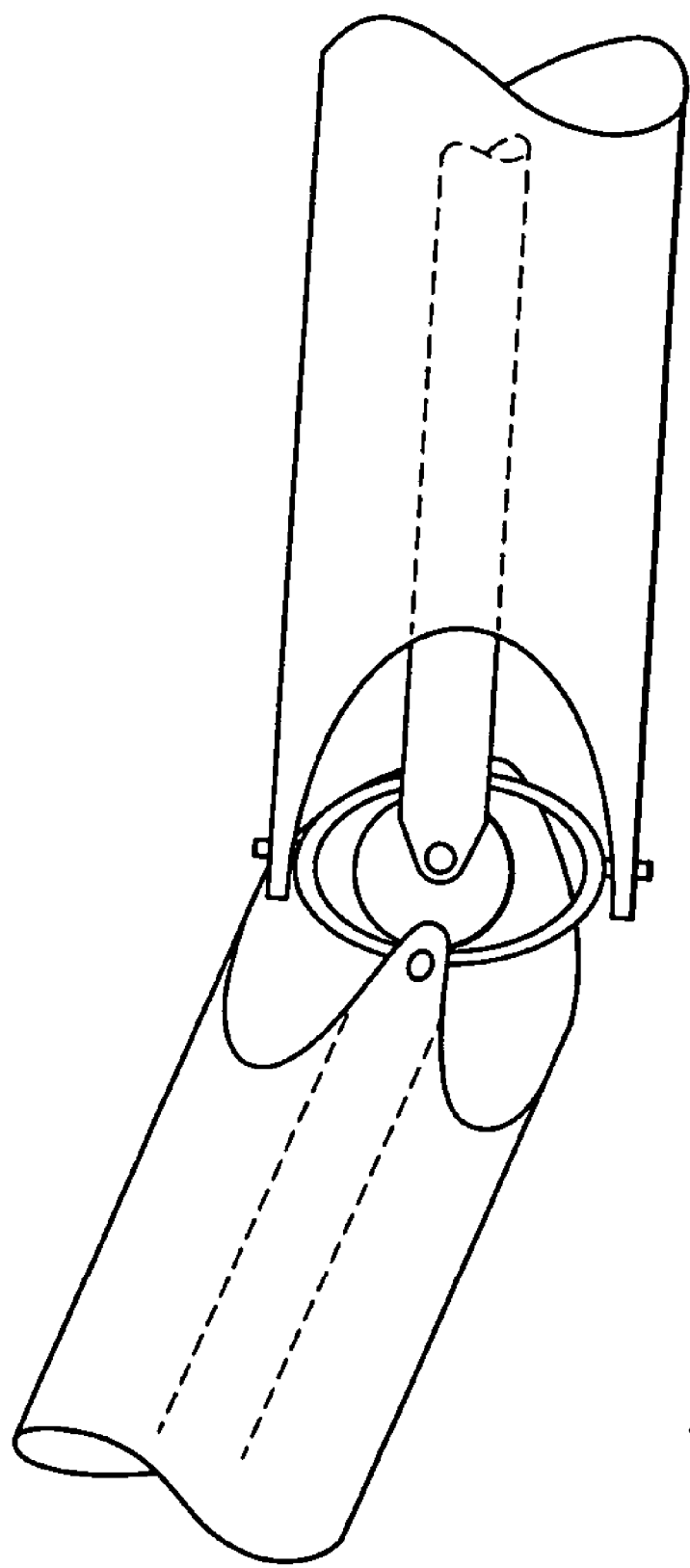
FIG. 12 shows another embodiment of a linkage mechanism in accordance with the present invention.

Furthermore, it is not necessary to drive the cylinders at the top and bottom of the structure. It is possible to mount the motors on a bracket (for example, secured to the linkage) in order to drive the cylinders at the slew bearing where the cylinders rotationally engage. Such a configuration would be required to drive the three cylinder embodiment shown in FIG. 6. Another alternative for mounting motors, specifically electric motors, is to mount the motors on the inside walls of the cylinders and use a conductive rotary track mounted on the linkage to deliver the electric current through such wires. Yet another alternative for mounting the motors is to mount them completely outside the cylinders similar to the embodiment shown in FIG. 11. In this case two universal joints can be built inside each other, as shown in FIG. 12. The center universal joint is to have the linkage rod that controls the upper deck and the outside universal joints is to control a coinciding pipe that has gears at the top to turn the top cylinder and gears on the bottom deck to engage the motor.

Figure 9:
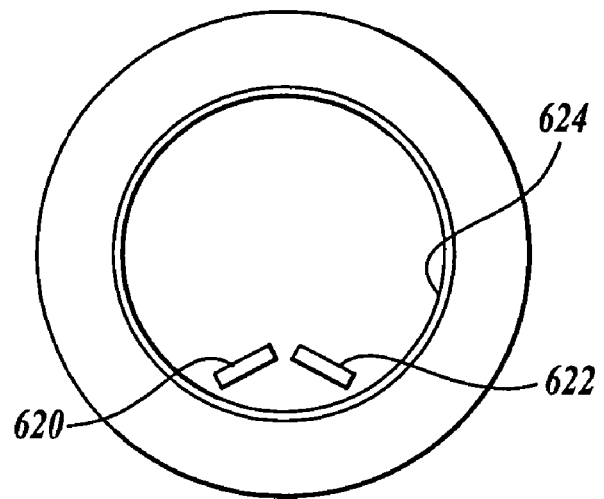
FIG. 9 illustrates one embodiment of a locking mechanism for inhibiting movement of the cylinders.

In some instances, it is desirable to inhibit the movement of the cylinders with respect to a supporting surface, with respect to each other or with respect to the surface to be maintained in a desired orientation. As shown in FIG. 9, one or more levers 620, 622 can be added to the mechanism to engage gears 624 of a slew bearing that supports a cylinder to inhibit movement of the cylinder with respect to the slew bearing. In this manner, the support for a surface to be maintained in a particular orientation. Upon release of the levers, the cylinders are free to move with respect to the slew bearings.

Although the described embodiments of the invention are primarily directed towards keeping a surface level, it will be appreciated that the invention could also be used to keep a surface at any desired angle despite movement of a supporting structure. Similarly, the surface can be selectively moved over a range of angles. For example, the surface may include a mirror and the position of the cylinders selectively changed so that the mirror can act as a scanning mechanism for bar-codes or the like. FIG. 11 illustrates an embodiment that can be used to move a mirror or other surface in a desired pattern for use as a scanner for example. A mirror 700 is fixedly secured to the upper rim of an upper cylinder 702. A lower cylinder 704 is rotatably secured to a fixed surface 706 and rotatably secured to the upper cylinder 702 at an engaging surface 708. A motor 718 drives the upper cylinder and the mirror via a linkage 720 through a bearing 730. The linkage includes a first arm 722 and a second arm 724. The second arm is connected to the mirror with a joint 726 and to the first arm 722 with a universal joint 728.

In this embodiment, it is not required that the joint 726 be a universal joint (it can be a fixed joint) or that the frame of reference of the mirror 700 be the same as the fixed surface 706. A motor 740 and a gear 742 drive the lower cylinder 704 with respect to the fixed surface 706 and the upper cylinder 702.

Although the disclosed embodiments of the invention use cylinders to support a surface in a desired orientation, it will be appreciated that other column shapes could be used to support a surface such as columns that are triangular, square, rectangular, oval, etc., in cross-section provided that the sections of the columns can be moved with respect to each other to change the angle between them.

The embodiments shown in FIG. 3 and FIG. 4 describe a linkage with three universal joints such that if there is a payload on the deck, such as a helicopter, causing deflections of the deck the deflections will be absorbed by the universal joints. However, if there is no payload on the deck and only dead load or the load spans directly to the slew bearings as for example the light scanner it has a mirror of a set weight and can be designed to only have one universal joint at the center of FIG. 3 or two universal joints at the top and bottom of FIG. 4. The unused universal joint/joints are replaced with a fixed connection. This situation can happen also in guns and artillery and so forth. Thus, the number of universal joints will vary per application and the required number of universal joints is three or less for two cylinders or columns.

Figure 13:
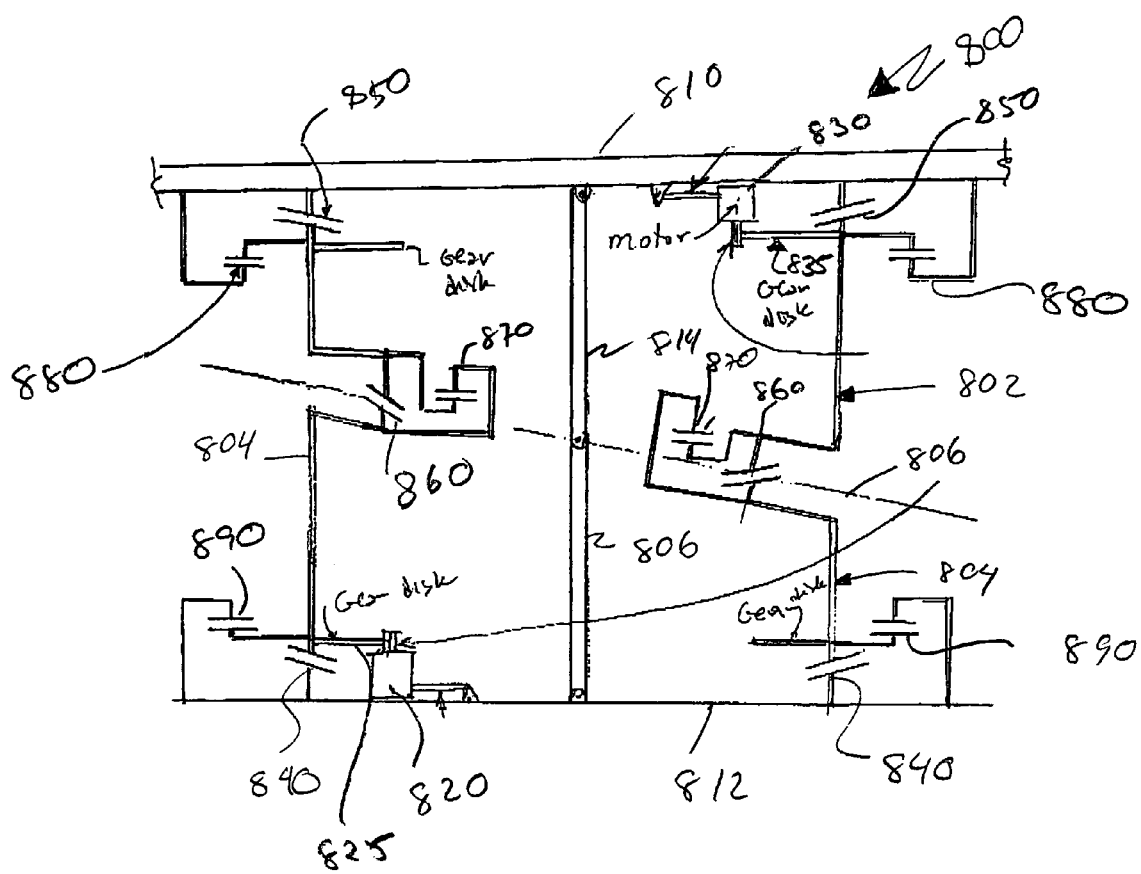
FIG. 13 illustrates yet another embodiment of a mechanism for maintaining a surface in a desired orientation in accordance with the present invention.

FIG. 13 illustrates a cross-sectional view of another embodiment of a mechanism for maintaining a surface, such as a landing pad, in a desired orientation, in accordance with the present invention. The mechanism 800 includes an upper cylinder 802 and a lower cylinder 804 that are rotatably coupled along an axis 806 which is oriented at an angle with respect to a line normal to the longitudinal axis of the cylinders 802 and 804. Rotatably coupled to the top cylinder 802 is a surface 810 that is desired to be maintained in a specific orientation. The top surface 810 is secured to a fixed surface 812 that supports the lower cylinder through a linkage mechanism 814. A motor 820 and spur gear combination 825 drive the lower cylinder with respect to the fixed surface 812. Similarly, a motor 830 and spur gear 835 drive the top cylinder with respect to the surface 810.

Unlike the previously disclosed embodiments of the invention, the rotating cylinders are coupled to each other and to the top surface 810 and the fixed surface 812 with frictionless bearings. Such bearings may include magnetic bearings or pneumatic frictionless bearings, etc. For example, the lower cylinder 804 is coupled to the fixed surface 812 with a magnetic bearing 840. The magnetic bearing 840 is preferably sloped such that the lower cylinder 804 remains centered on the bearing and does not ride off the bearing. Similarly, the upper cylinder 802 is coupled to the top surface 810 with a magnetic bearing 850. Again, in the embodiment shown, the bearing 850 is angled such that the top surface 810 remains in the bearing 850 as the cylinder rotates. In addition, further magnetic or other frictionless bearings 860 may be positioned at the junction of the upper cylinder 802 with the lower cylinder 804. Optional additional magnetic or frictionless bearings 870, 880 and 890 can be used to counterbalance large overturning live load moments at the deck 810 and to keep the whole embodiment together.

With the magnetic or other frictionless bearings, the mechanism 800 can operate with reduced power and more smoothly than if conventional ball bearing or other bearing mechanisms are used.

Figure 14:
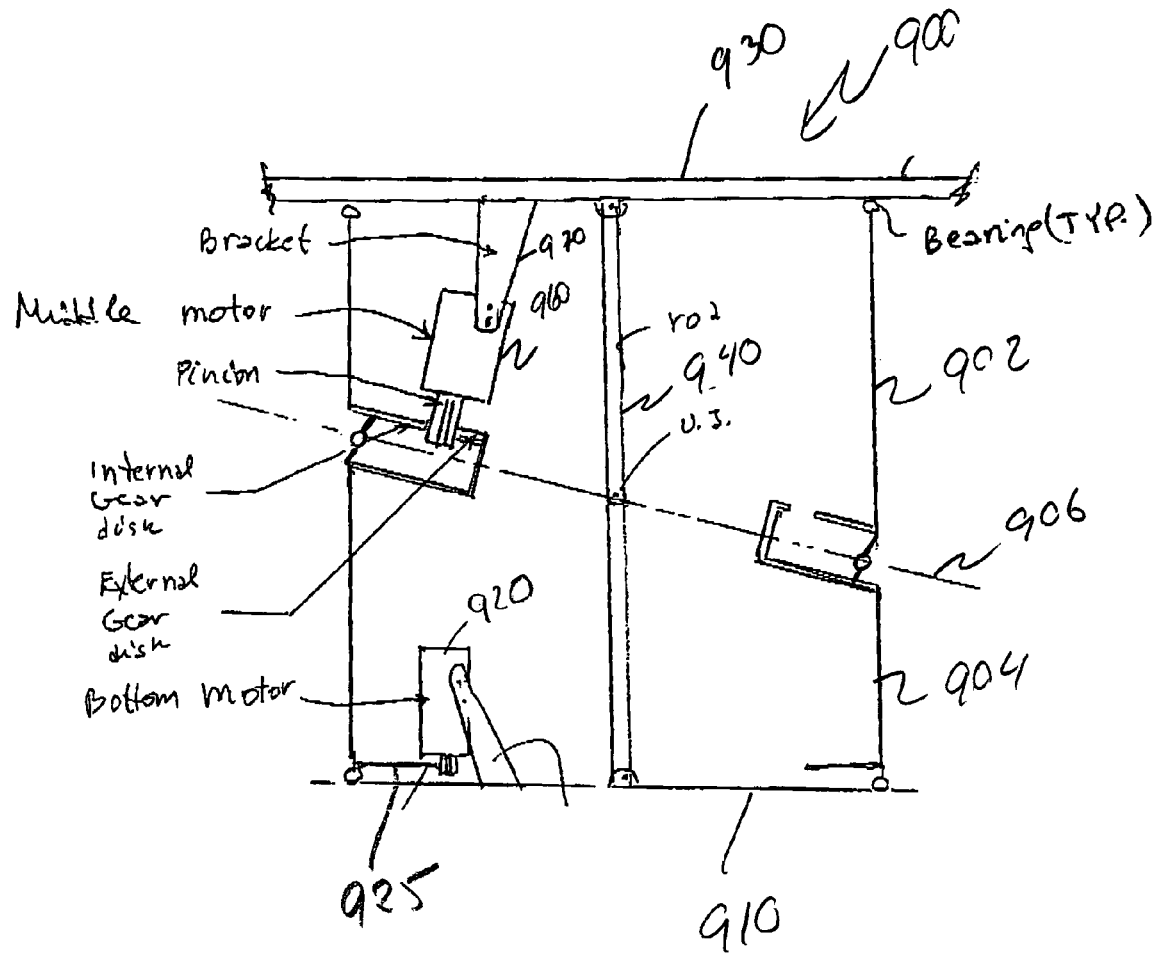
FIG. 14 illustrates another embodiment of a mechanism for maintaining a surface in a desired orientation in accordance with the present invention.

FIG. 14 shows yet another alternative embodiment of the present invention. In this embodiment of the invention, a mechanism 900 for maintaining a surface in a desired configuration includes an upper cylinder 902 and a lower cylinder 904 which are rotatably coupled along an axis 906 that extends at an angle with respect to a line perpendicular to the longitudinal axis of the two cylinders 902 and 904. As with the previous embodiments of the invention, the lower cylinder is rotatably coupled to a fixed surface 910 with a motor 920 and a spur gear 925. The motor and spur gear combination rotate the lower cylinder 904 with respect to a fixed surface 910. An upper surface 930 is coupled to the fixed surface 910 through a linkage mechanism 940 as described above. However, in this embodiment of the invention, a motor 960 is coupled to the upper surface 930 with a bracket 970. The motor 960 drives a gear like a spur gear or a gear with an annular engaring surface, which is oriented along an angled bearing 906 that joins the upper cylinder 902 to the lower cylinder 904. In this embodiment, the pinion gear coupled to the motor 960 must be able to stay in contact with the gear regardless of the orientation of the upper and lower cylinders 902, 904. Selective orientation of the surface 930 is achieved by rotating one or both of the upper cylinder 902 and lower cylinder 904 using the motors 920 and 960. As with previously disclosed embodiments, a sensor (not shown) measures the orientation of either the top surface or the fixed surface and a computer (not shown) drives the motors to orient the top surface in the desired position.

While the preferred embodiment of the invention has been illustrated and described, it will be appreciated that various changes can be made therein without departing from the scope of the invention. The scope of the invention is therefore to be determined from the following claims and equivalents thereof.

What is claimed is:

1. A system for maintaining a surface in a desired orientation, comprising:
   at least two columns that are rotatably coupled along engaging surfaces that are oriented at an angle with respect to a perpendicular cross section of the columns, said at least two columns including a first column that is rotatably coupled to the surface and a second column rotatably coupled to a supporting surface;
   a linkage that joins the surface to be maintained in a desired orientation and the supporting surface and allows the surface to move with respect to the supporting surface but not to rotate with respect to the supporting surface:
   means for rotating the first column with respect to the second column and means for rotating the second column with respect to the supporting surface;
   one or more frictionless bearings for rotatably coupling the columns;
   a sensor for producing an orientation signal; and
   a computer for selectively driving the means for rotating the first and/or second column to maintain the surface in the desired orientation.

2. The system of claim 1, wherein the linkage has at least a first arm and a second arm having a hinge at each end.

3. The system of claim 2, wherein the hinges are universal joints.

4. The system of claim 1, wherein the engaging surfaces are elliptical and the first and second columns include a track that allows the elliptical engaging surfaces of the columns to rotate on each other.

5. The system of claim 1, further comprising a cover that is positioned over the engaging surfaces of the first and second column to maintain the alignment of the first and second column.

6. The system of claim 1, wherein the frictionless bearings are magnetic levitation bearings.

7. The system of claim 1, wherein the frictionless bearings are pneumatic.

8. The system of claim 1, wherein the surface to be maintained in a desired orientation is a landing pad.

9. The system of claim 1, wherein the engaging surfaces of the first and second cylinders include Teflon bearings.

10. The system of claim 1, wherein the first and second columns are cylindrical.

11. A system for positioning a surface in a desired orientation, comprising:
    a first column rotatably coupled to a surface to be positioned in a desired orientation;
    a second column that is rotatably coupled to a fixed surface, wherein the first and second columns are rotatably coupled at an engaging surface and wherein the first column is coupled at an angle with respect to the surface to be positioned in a desired orientation and the second column is coupled at an angle with respect to the fixed surface;
    a linkage joining the surface and the fixed surface that allows the surface to move with respect to the fixed surface but not to rotate with respect to the fixed surface;
    means for moving the first column with respect to the second column and means for moving the second column with respect to the fixed surface;
    a sensor for producing a position signals; and
    a computer for receiving the position and selectively operating the moving means to rotate the first and/or second columns such that the surface coupled to the first column is positioned in the desired orientation.

12. The system of claim 11, wherein the linkage includes a first arm and a second arm, the first arm coupled to the surface that is maintained in a desired orientation with a universal joint and to the second arm with a universal joint, the second arm also being coupled to the fixed surface with a universal joint.

13. The system of claim 11, wherein the means for moving the first column and the means for moving the second column comprise electric motors.

14. The system of claim 11, wherein the means for moving the first column and the means for moving the second column comprise hydraulic actuators.

15. The system of claim 11, wherein the means for moving the first column and the means for moving the second column comprise pneumatic actuators.

16. The system of claim 11, wherein the first and second columns are cylindrical.

17. The system of claim 11 wherein the means for moving the first column with respect to the second column includes a motor secured to the surface and a gear that is aligned with the engaging surface of the first column and the second column.

18. The system of claim 11, wherein the first and second columns are rotatably coupled with frictionless bearings.

19. A system for positioning a surface in a desired orientation, comprising:
    at least two columns that are rotatably coupled with one or more engaging surfaces that are oriented at an angle with respect to a perpendicular cross section of the columns, said at least two columns including a first column that is rotatably coupled to the surface and a second column rotatably coupled to a supporting surface;
    linkage that joins the surface to the supporting surface to allow the surface to tilt with respect to the supporting surface but not to rotate with respect to the supporting surface;
    means for rotating the first column with respect to the second column and means for rotating the second column with respect to the supporting surface; and
    a computer for selectively driving the means for rotating the first and/or second column to position the surface in the desired orientation.

20. The system of claim 19, wherein the engaging surfaces are rotatably coupled with frictionless bearings.

21. A system for selectively orienting a surface with respect to a fixed surface, comprising:
    a first cylinder rotatably coupled to the surface to be oriented;
    a second cylinder rotatably coupled to the fixed surface and rotatably coupled to the first cylinder;
    a linkage joining the surface to be oriented and the fixed surface such that rotation of the first cylinder with respect to the second cylinder allows the surface to be oriented to tilt with respect to the fixed surface but not to rotate with respect to the fixed surface;
    one or more motors that move the first cylinder with respect to the second cylinder and the second cylinder with respect to the fixed surface;
    a sensor that detects the orientation of the first surface; and
    a computer system that controls the one or more motors to move the first and/or second cylinder in order to selectively orient the surface.

22. A system for orienting a movable surface with respect to a reference surface, comprising:
- a first cylinder rotatably coupled to the movable surface;
- a second cylinder rotatably coupled to the reference surface and rotatably coupled to the first cylinder;
- a linkage that joins the movable surface and the reference surface to allow the movable surface to tilt with respect to the reference surface but not to rotate with respect to the reference surface;
- a motor coupled to the movable surface that engages the second cylinder to move the second cylinder with respect to the first cylinder and a motor that moves the second cylinder with respect to the reference surface;
- a sensor that produces position signals; and
- a computer that receives the position signals and activates on orient the movable surface in a desired position.

23. The system of claim 22, wherein the first and second cylinders are coupled together at an angle with respect to the longitudinal axis of the cylinders.

24. The system of claim 22, wherein the first and second cylinders are coupled to the movable and reference surfaces at an angle with respect to the longitudinal axis of the cylinders.

* * * * *